Oct. 20, 1936.   M. PARVILLÉ   2,057,736

UNIVERSAL TRANSMISSION JOINT

Filed June 3, 1935   3 Sheets-Sheet 1

MAURICE PARVILLE
INVENTOR
BY
ATTORNEY

Oct. 20, 1936.  M. PARVILLÉ  2,057,736
UNIVERSAL TRANSMISSION JOINT
Filed June 3, 1935   3 Sheets-Sheet 3
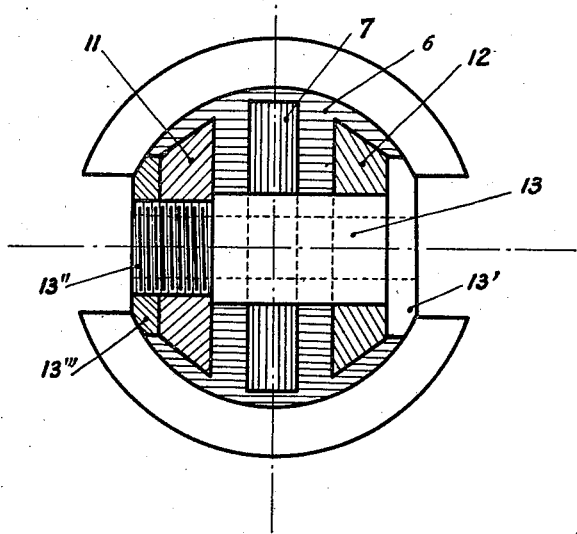
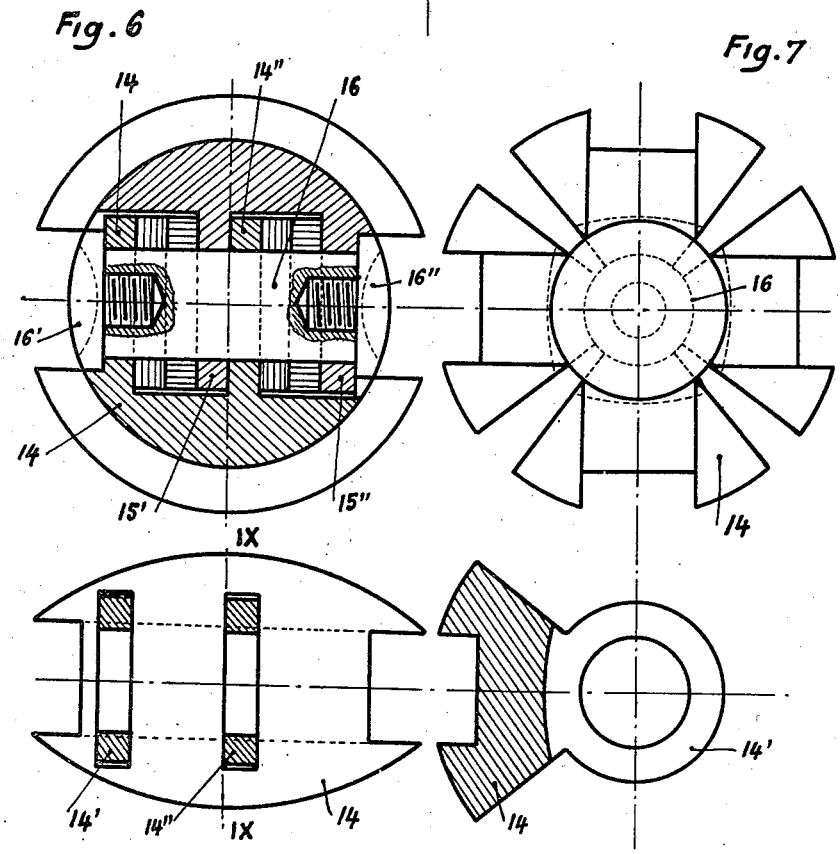
MAURICE PARVILLE
INVENTOR
BY *Joseph J. Juhasz*
ATTORNEY Patented Oct. 20, 1936

2,057,736

UNITED STATES PATENT OFFICE 2,057,736

UNIVERSAL TRANSMISSION JOINT

Maurice Parvillé, Paris, France, assignor to Société la Precision Moderne, Paris, France, a corporation of France Application June 3, 1935, Serial No. 24,638
In France June 7, 1934

5 Claims. (Cl. 64—21)

This invention relates to a universal joint enabling the transmission of the rotary motion of one shaft to another shaft which may be in respect of the first shaft situated in any variable direction, and giving the driven shaft elementary angular displacements which are constantly equal to those of the driving shaft.

Joints of that kind are particularly useful for motor vehicles with front driving and steering wheels; in such vehicles the rotating motion of these wheels must be as strictly uniform as that of the motor in order to ensure the regular motion of the vehicle and to avoid abnormal wear of the tyres and of the mechanical members, or even to avoid the breaking of the latter.

The joint according to this invention is characterized in that it is formed by a socket and knuckle, said knuckle being constituted by a series of independent spherical segments spaced from one another and adapted to oscillate about their common axis, caps provided and the ends of the driving and driven shafts, and said spherical segments being provided respectively with at least three cooperating gudgeons and grooves, which are set at uniform intervals around the axes of said shafts and knuckles and similarly on both shafts.

The accompanying drawings illustrate, by way of example, a joint according to invention.

Figure 5 shows a variation of the guiding device of the spherical segments of the knuckle and illustrates this device in a diametral section through the common mean plane of two opposite segments.

Figures 6 to 9 illustrate another variation of the guiding device and show:—

Figure 1:
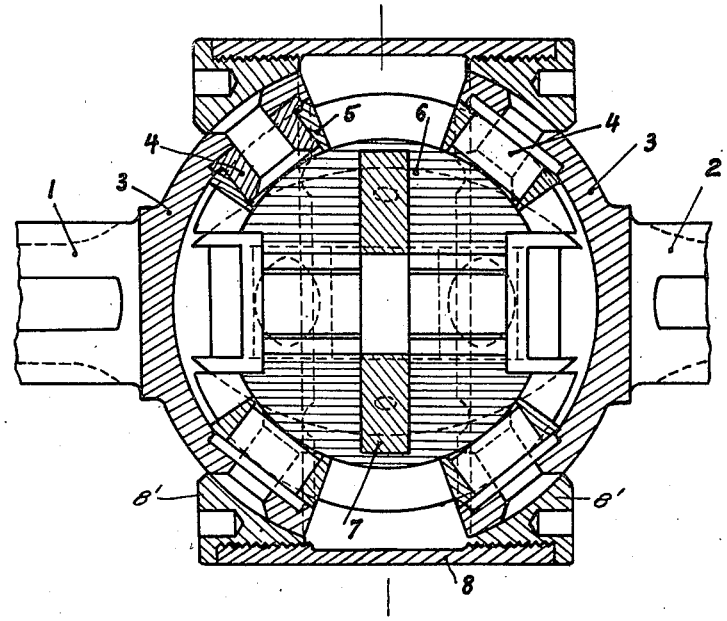
Figure 1 is a sectional view through the axis of the joint, when not deviated.

Figures 6 and 7 a diametral section and an end view of the knuckle,

Figures 8 and 9 view from underneath and in section along line IX—IX of Figure 8 respectively of one spherical segment.

The driving shaft 1 and the driven shaft 2 carry each a cap 3, which may either form the same piece with the shaft or be keyed on same.

Each of these caps carries a series of gudgeons 4 (four in the drawings) each series comprising not less than three gudgeons and both series comprising the same number of gudgeons, on which may turn freely bearings 5.

On each cap, these gudgeons are situated at uniform intervals along a circumference perpendicular to the shaft and the two circumferences of both shafts are of the same diameter on the two caps in a manner that all the gudgeons are situated at the same distance from the axis of symmetry of Figure 1.

The bearings 5 may slide in circular grooves 6' provided in the outer portion of the spherical segments 6 which are spaced from one another and are situated freely around a common axis, and they form together in a manner which may be compared to an orange several portions of which are missing, the knuckle of the joint.

It is understood that the gudgeons and the grooves may be respectively provided indifferently on the caps or on the segments, the bearings of the caps sliding in the grooves of the segments in one case, or inversely the bearings of the segments sliding in grooves provided in the caps, and no change in the working of the device is thus caused, the only necessary condition being that the bearings should be positioned at uniform intervals on each shaft and symmetrically on both shafts.

The spaced segments are located around a disk 7 into which they are let in and which ensures their centering. They can move in a circular motion around the disk owing to an angular space of small amplitude existing between them.

A cylindrical casing 8 provided with screwed spherical rings 8' which may slide on the spherical caps 3 connects these caps around the center and is itself connected with one of the segments by means of screws 8".

The working of the device is the following:—

Figure 2:
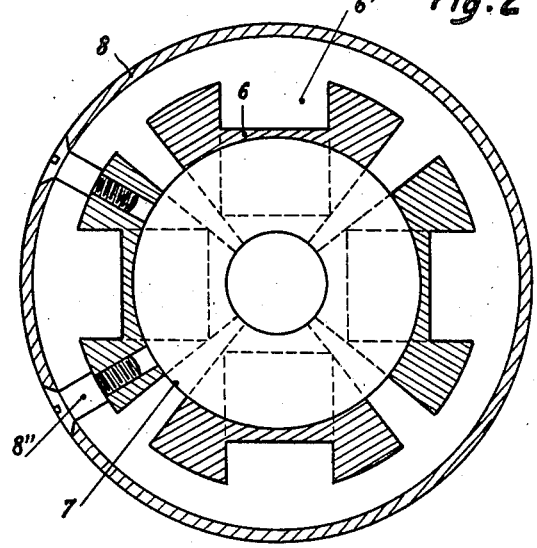
Figure 2 is a sectional view perpendicular to the axis of the joint along the line II—II of Figure 1.

Referring to Figures 1 and 2 in which the axes of the shafts 1 and 2 are in a straight line it may be seen that if one of the caps 3 is possessed with a rotating motion, the segments 6 are driven in the same motion, as if they formed part of a complete sphere, and therefore the second cap 3 receives necessarily the same motion.

The disk 7 prohibits the distortion which would happen if one of the caps rotated whilst the other remained still, and, in the rectilinear position of the joint, the regular transmission of the rotation from one shaft to another is ensured in the same way as it would be if a single massive member replaced the segments.

Figure 3:
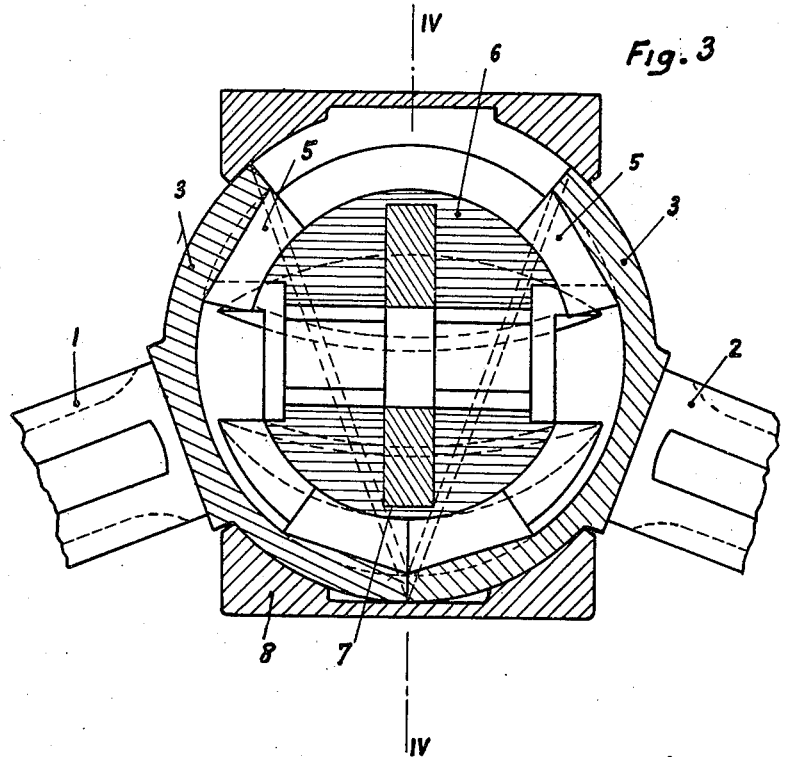
Figure 3 is a view, similar to Figure 1, when the joint is deviated.
Figure 4:
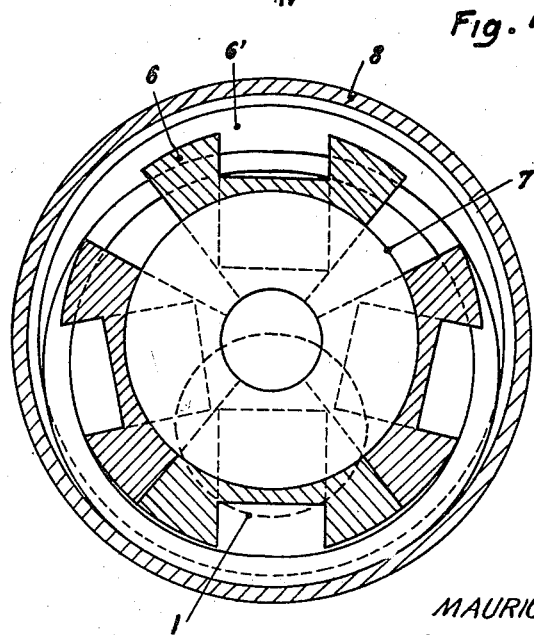
Figure 4 is a sectional view perpendicular to that of Figure 3 and along line IV—IV of said figure.

Figures 3 and 4 show the working when the joint is deviated from its rectilinear position.

The caps 3 driven in rotation by the shaft and set at angle to one another, force the segments 6, by means of the gudgeons 4, to perform a circular displacement about the disk, this resulting in that the axes of the gudgeons are displaced along the grooves 6' provided in the segments 6.

This motion of the segments 6 is produced simultaneously with the rotation of the disk 7 around an axis passing through its center and directed prependicularly to the bisector of the angle formed by the axes of the two shafts.

The rigidity of the disk 7 prohibits any distortion of the device, and owing to the situation of the gudgeons, which are placed in both the caps at an equal distance from the center, said disk comes necessarily to be situated in the bisector plane of the angle formed by the shafts.

Owing to the provision of several gudgeons placed at uniform intervals around the axis of the shaft, the aforesaid motion is produced at all the instantaneous positions of rotation, and the necessary and sufficient condition for synchronizing the rotations of the two shafts is thus fulfilled.

It should be noted, on the other hand, that in the joint according to invention all the members are driven in rotation; the segments 6, driven by the gudgeons 4 provided on the caps, set in rotation the disk 7 by friction, and the caps 3 also drive in rotation the outer casing 8 equally by friction.

It may be seen that if one of the shafts, in practice the swivel of the wheel, when the joint is applied to motor vehicles, is supported by two bearings or by two ball races, the center of the joint is sufficiently fixed by the member formed by the spherical caps and the casing, so as to render unnecessary to provide any support for the intermediary shaft of the vehicle or for the joint itself; the elimination of this support which is necessary for most of the existent joints permits an increase of the efficiency.

In order to avoid a wear of the guiding member of the spherical segments of the knuckle and to ensure the proper location of these segments, said guiding member should disclose wide bearing surfaces.

According to Figure 5 the guiding of the spherical segments 6 is ensured not only by the circular disk 7, but also by two truncated rings 11—12, let into these segments and mounted on a shaft 13 provided with a let in head 13', and on the threaded end 13" of which is screwed a let in ring 13'''.

According to Figures 6 to 9 each spherical segment is provided with two eyes 14', 14", concentrical with the common axis of the segments; for instance, the segment 15 is also provided with eyes 15', 15". The eyes 14', 14"—15', 15" etc. are shifted in respect of one another in a manner that when the segments are in position their eyes should be imbricated into one another similarly to the eyes of the two portions of a hinge. A shaft 16 is passed through all these eyes and is maintained in position by the large heads of two screws 16', 16", provided at its ends and let into the segments.

What I claim is:—

1. Joint for the transmission of power between two shafts making with one another a variable angle, the joint being adapted to give to the driven shaft elementary angular rotations constantly equal to those of the driving shaft, whatever the angle made by the two shafts may be, the joint comprising in combination two spherical caps of same centre and of same radius and integral respectively with the two shafts, a series of identical spherical segments, three at least, spaced from one another and disposed about their common diameter in a manner to be able to oscillate about said common diameter, means for guiding said spherical segments in their oscillation, means for connecting in rotation said spherical segments with each one of said spherical caps, and a casing maintaining said spherical caps together.

2. Joint according to claim 1, in which said means for connecting in rotation said spherical segments to said spherical caps are constituted by gudgeons disposed on each one of said spherical caps in a number equal to that of said spherical segments, and by the same number of longitudinal grooves drilled respectively into said spherical segments and cooperating with said gudgeons, the latter being distributed uniformly on two equal circles perpendicular to the respective shafts and disposed at equal distance on either side of the centre of the joint.

3. Joint according to claim 1, in which said means for guiding said spherical segments in their oscillation are constituted by a disc fitted in said segments perpendicularly to their common axis.

4. Joint according to claim 1, in which each of said spherical segments comprises at least two eyes, the eyes of all the segments being disposed concentrically with the common axis of the segments and offset with respect to one another along said common axis, said means for guiding said spherical segments in their oscillation being constituted by a shaft passing through said eyes of said segments.

5. Joint according to claim 1, in which said casing maintaining together said spherical caps is fixed rigidly to one of said spherical segments.

MAURICE PARVILLÉ.